United States Patent [19]

Harm et al.

[11] Patent Number: 5,138,543
[45] Date of Patent: Aug. 11, 1992

[54] OUTPUT VOLTAGE ESTIMATING CIRCUIT FOR A POWER CONVERTER HAVING GALVANIC ISOLATION BETWEEN INPUT AND OUTPUT CIRCUITS

[75] Inventors: Charles E. Harm, Dallas City, Tex.; George Knoedl, Milford; William A. Nitz, Rockaway, both of N.J.

[73] Assignee: AT&T Bell Laboratories, Murray Hill, N.J.

[21] Appl. No.: 708,537

[22] Filed: May 31, 1991

[51] Int. Cl.[5] ............................................. H02M 3/335
[52] U.S. Cl. .......................................... 363/21; 363/97
[58] Field of Search ...................................... 363/21, 97

[56] References Cited

U.S. PATENT DOCUMENTS

| | | | |
|---|---|---|---|
| 3,564,393 | 2/1971 | Williamson | 363/21 |
| 4,467,406 | 8/1984 | Hattori et al. | 363/19 |
| 4,908,755 | 3/1990 | Feldtkeller | 363/56 |
| 4,996,638 | 2/1991 | Orr | 363/21 |

Primary Examiner—William H. Beha, Jr.
Attorney, Agent, or Firm—A. G. Steinmetz

[57] ABSTRACT

A method of and apparatus for monitoring the output signals of a power converter, having galvanic isolation between the input and output, observes the voltage and current on the primary side of the converter as reflected through a tertiary winding or influenced through the primary winding of the power transformer and applies error corrections thereto to replicate the output signal. These corrections are arrived at by compensating for operational differences between input and output circuitry and by emulating, on the primary side, the output side circuitry that causes the differences between the output signal and the reflected signal, and the conditions to which the output side circuitry is subjected. The resulting replicated signal is applied to feedback control circuitry, in lieu of the actual output signal, and used to regulate the output of the power converter.

10 Claims, 5 Drawing Sheets

OUTPUT VOLTAGE ESTIMATING CIRCUIT FOR A POWER CONVERTER HAVING GALVANIC ISOLATION BETWEEN INPUT AND OUTPUT CIRCUITS

FIELD OF THE INVENTION

This invention relates to a power converter with full DC galvanic isolation between its input and output circuitry and, in particular, to a power converter having circuitry on its input side to estimate signal conditions on its output side.

BACKGROUND OF THE INVENTION

Power converters typically are required by imposed safety requirements to provide full DC galvanic isolation between the input source common return circuit and the output load common return circuit. This full DC galvanic isolation is normally provided by use of a power transformer which blocks DC current flow between the primary and secondary circuitry (e.g., in galvanic isolation there is no DC current path across the isolation barrier). Power converters typically also require the output signals to be regulated. That is, the output voltage and/or current must somehow be sensed and made to fall within some boundary limit of specified values. To achieve this, without breaching the DC galvanic isolation provided by the power transformer, commonly requires a secondary to primary feedback path including an opto-isolator, signal transformer or some other isolating signal means, to provide the desired galvanic isolation between input and output.

The regulating circuitry is normally divided into circuitry at both the primary and secondary sides of the converter. The secondary side circuitry senses the output signal to be regulated and the primary side circuitry controls a power switch to achieve the desired regulation. The division of the regulating circuitry between input and output and the galvanic isolating devices required in the feedback path increases the parts count of the converter and increases its size and expense. It is desirable to reduce the parts count to enhance circuit reliability. It is also desirable to reduce both cost and circuit size in many applications. Among existing methods that eliminate the need for a separate isolating feedback path are the techniques of implicit primary side sensing and post secondary regulation.

Post secondary regulation, implies an added power processing module subsequent to the power converter itself. It adds complexity to the overall system and significantly increases the system parts count. It additionally detracts from the power system efficiency since it uses a separate power processing module in tandem with the primary power converter and the overall efficiency is the product of the two individual efficiencies.

Implicit sensing on the primary side of the converter need not significantly impact the efficiency of the power processing system and it may be implemented within integrated circuitry that combines it with other control functions of the converters. One well known method of implementing implicit sensing is to add a tertiary winding to the power transformer to enable sensing of a signal related to the output signal of the converter. A typical implicit sensing arrangement in a flyback type power converter senses a voltage from a tertiary winding on the power transformer. This voltage is sensed without compromising the DC galvanic isolation between input and output. However, the regulation based on this sensed voltage tends to be inaccurate since the tertiary winding voltage is not necessarily directly proportional to the output load voltage. Estimated voltages derived from this tertiary winding are inaccurate since estimated currents tend to be a constant while the actual output load currents vary.

Implicit sensing of output voltages and currents is typically dependent on static estimating circuit arrangements that do not accurately reflect the dynamic nature of the power converters output signals. Such arrangements tend to be relatively inaccurate in estimating the output signals at the primary side. Neither output currents nor output voltages are reflected accurately in these arrangements. Regulation accuracy using these implicit sensing schemes is typically 10% to 20% and is functional only over a very limited range of load current. To be effective and achieve accurate regulation, an implicit sensing scheme at the input must accurately reproduce the signal conditions at the output of the converter.

SUMMARY OF THE INVENTION

A method of, and apparatus for estimating the output signals of a power converter, having DC galvanic isolation between the input and output, observes the voltage and current on the primary side of the converter as reflected through a tertiary winding or influenced through the primary winding of the power transformer and applies error corrections thereto to accurately replicate the actual output voltage and/or current signals. These corrections are arrived at by compensating for operational differences between input and output circuitry and by emulating, on the primary side, the output side circuitry that causes the differences between the actual output signal and the reflected signal. The resulting replicated signal is applied to primary side feedback control circuitry, in lieu of the actual output signal, and used to regulate the output of the power converter.

In a particular embodiment of the estimating circuitry the diode current of the estimating circuit is adjusted by an input/output voltage ratio to make it more accurately proportional to the output rectifier current. The estimating circuitry compensates for the differing duty ratios of the power switch and the rectifying diode and hence, increases the accuracy of the estimated output current. The resistance of the estimating circuitry is also made to be proportional to the resistance of the output circuitry on the secondary side to improve accuracy. The reflected output voltage may also be extracted from the primary winding eliminating the need for an added tertiary winding.

DETAILED DESCRIPTION

Figure 1:
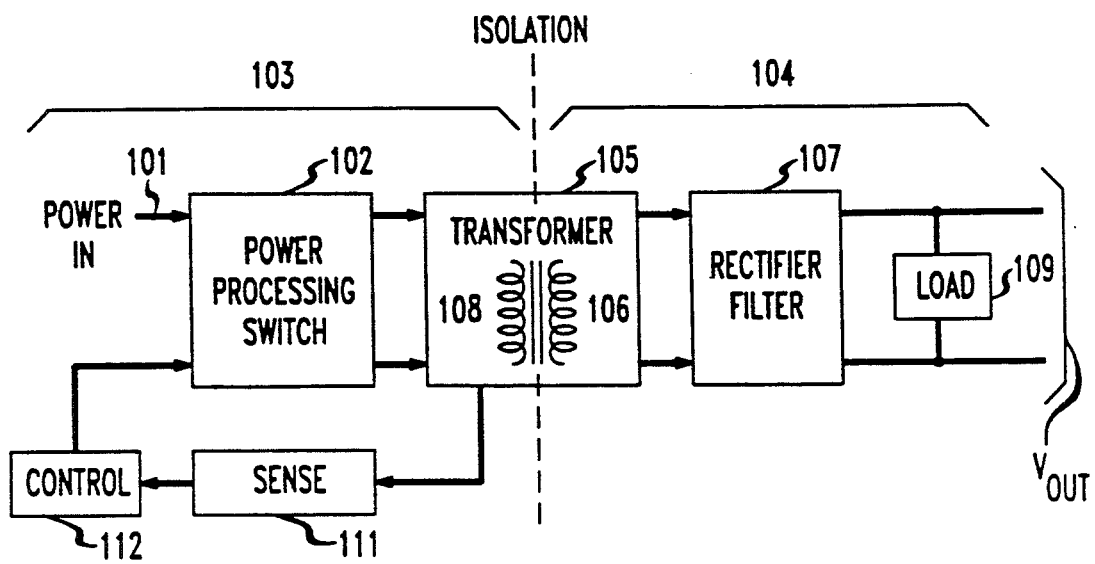
FIG. 1 is a block schematic of a power converter with DC galvanic isolation between its input and output circuitry and utilizing primary side implicit voltage sensing.

A power converter is shown in block schematic form in FIG. 1. As shown it encompasses both the prior art schematic of FIG. 2 and the power converter circuitry of the remaining figures embodying the principles of the invention. The power converter shown in FIG. 1 has a primary side circuit 103 and a secondary side circuit 104 galvanically isolated from each other by the power transformer 105. Input power is applied to the input lead 101 and chopped by the power processing switch 102 and applied to a primary winding 108 of the power transformer 105. The transformed signal at the secondary winding 106 of the power transformer 105 is rectified and filtered by the rectifier and filter circuit denoted by the block 107. Its output is applied to a load 109. A signal representative of the output voltage and/or output current is sensed on the primary side of the converter by the sense and estimator circuit 111. This sense and estimator circuit 111 may be connected to a tertiary winding of the power transformer or connected to sense a signal of the primary winding 108. Explicit techniques of sensing are disclosed herein below. The sensed signal is converted to a replica of the output by the sense and estimator circuit 111 and is used by a control circuit 112 to control a duty cycle or on/off ratio of the power switches of the power processing switch 102.

Figure 2:
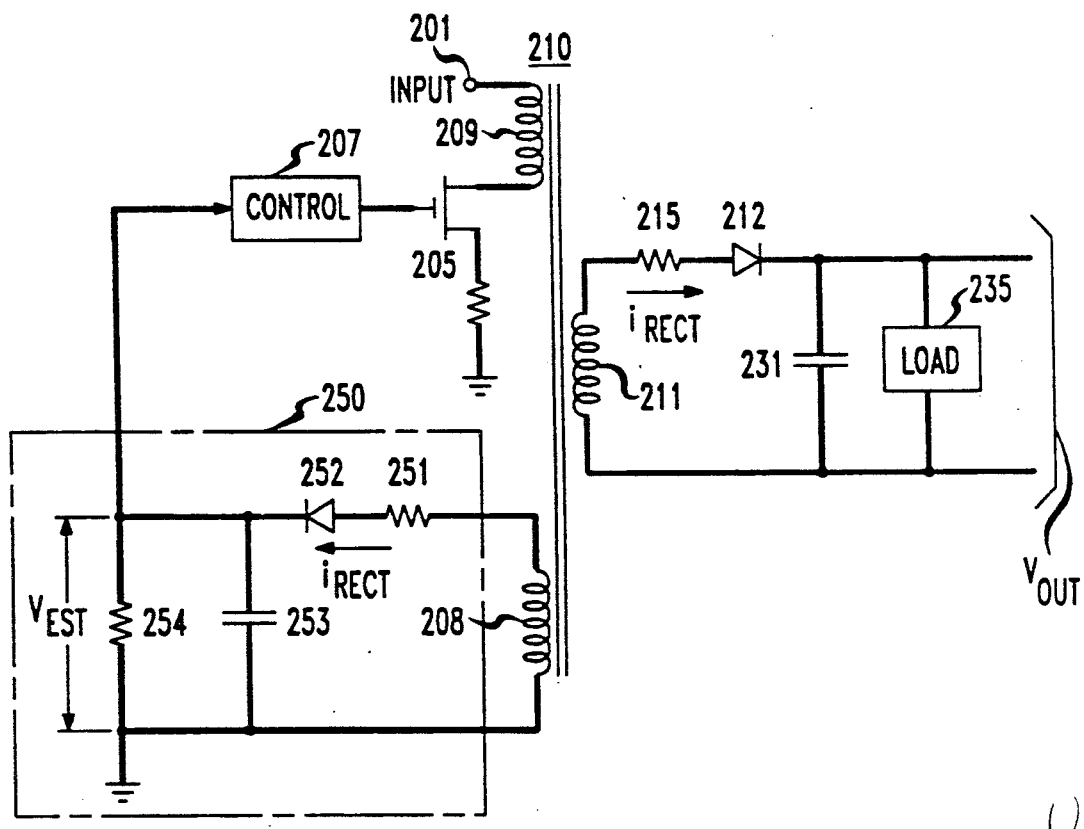
FIG. 2 is a schematic of a power converter of the prior art as defined by the block diagram of FIG. 1 and having implicit voltage sensing derived from a tertiary winding and using a static load replication.

The power converter of FIG. 2 includes estimator circuitry operative to replicate the output circuit signals on the primary side of the power converter. Input power is applied, via the input terminal 201, to the primary winding 209 of the power transformer 210. The input power is pulse width modulated by the FET power switch 205. Its switching action and duty ratio is controlled by the switch control circuit 207.

The signal of the primary winding is transformed and applied by the secondary winding 211 to the rectifying diode 212. A lumped resistor 215 represents the combined impedance of the output circuitry presented to the secondary winding 211. The power converter of FIG. 2 operates in a flyback mode in which the conduction of the power switch 205 is out of phase with the conduction of the rectifying diode 212. In a typical flyback converter, the power switch and rectifying diodes have conducting intervals of significantly different durations.

The signal rectified by diode 212 is applied to a filter capacitor 231 and to a load 235 to be energized. Voltage at the load 235 is regulated by controlling a duty ratio of the power switch 205. A switch control circuit 207 driving the power switch 205 determines this duty ratio in response to an estimated voltage generated by the estimator circuit 250 which is connected to a tertiary winding 208 of the power transformer 210.

Estimator circuit 250 includes a resistor 251, a diode 252, a capacitor 253 and a static load 254. Resistor 251 has a resistance value comprising the winding resistance of the tertiary winding 208 plus the body resistance of the diode 252.

This implicit sensing arrangement, shown in FIG. 2, uses a static estimated load 254 while in practice the actual loads of a power converter tend to vary considerably. As a result of this and other considerations discussed above, the simulated load current in the estimator circuit 250 does not track the load current supplied by the converter and thus the estimated output voltage does not necessarily accurately represent the actual output voltage of the converter. An actual 5 volt power converter circuit in this schematical embodiment could be expected to have a regulation of no better than 10% to 20% over a narrow load current range.

Figure 3:
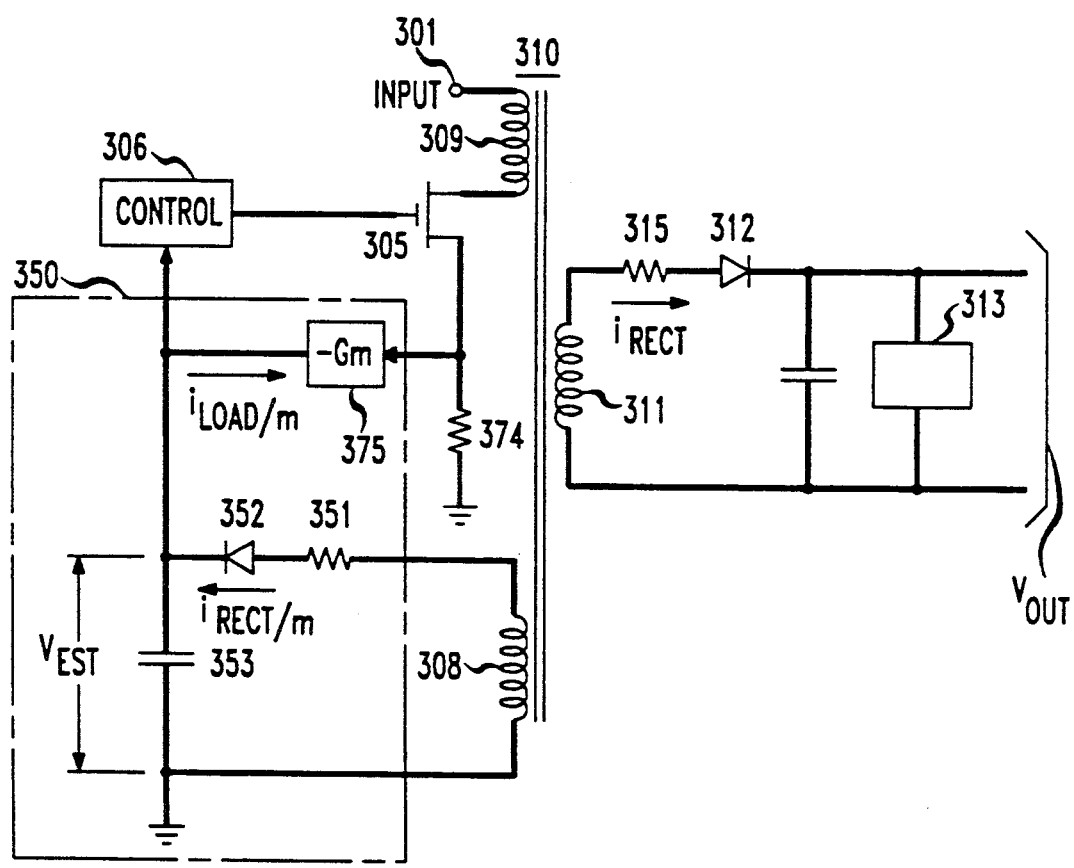
FIG. 3 is a schematic of a power converter embodying principles of the invention and having implicit voltage sensing derived from a tertiary winding and having implicit current sensing to achieve dynamic load replication.

The above discussed limitations of the estimator circuit of FIG. 2 are overcome in the estimator circuit disclosed in FIG. 3. The converter circuit of FIG. 3 discloses an implicit voltage sensing scheme with a dynamic surrogate load in the estimator circuit that accurately tracks the output load current.

Input power is applied to the primary winding 309 of the transformer 310, via lead 301. The quantum of power applied to the winding 309 is controlled by the modulating action of the FET power switch 305 under the control of control circuit 306. The output power is supplied from the secondary winding 311, through the rectifying diode 312 to a load 313.

A feedback signal for controlling the output voltage is derived from a tertiary winding 308 of the power transformer 310. The voltage of the tertiary winding 308 is applied to an estimator circuit 350 which replicates the action of the output circuitry at the output of the secondary winding 311. The estimator circuit 350 includes a resistor 351, a diode 352, a capacitor 353 and a dynamic load 375. The resistor 351($R_{est}$) is proportional to the resistance 315($R_{sec}$) by the load current scaling factor m. Where:

$$R_{est} = m \times R_{sec}.$$

A transconductance circuit 375 is connected to resistor 374 to sense the current through power switch 305. It is operative to control the current output ($i_{est}$) of the diode 352 to be a value proportional to the actual current ($i_{rect}$) of the rectifying diode 312 by the factor m. Where:

$$i_{rect} = i_{est} \times m.$$

Figure 4:
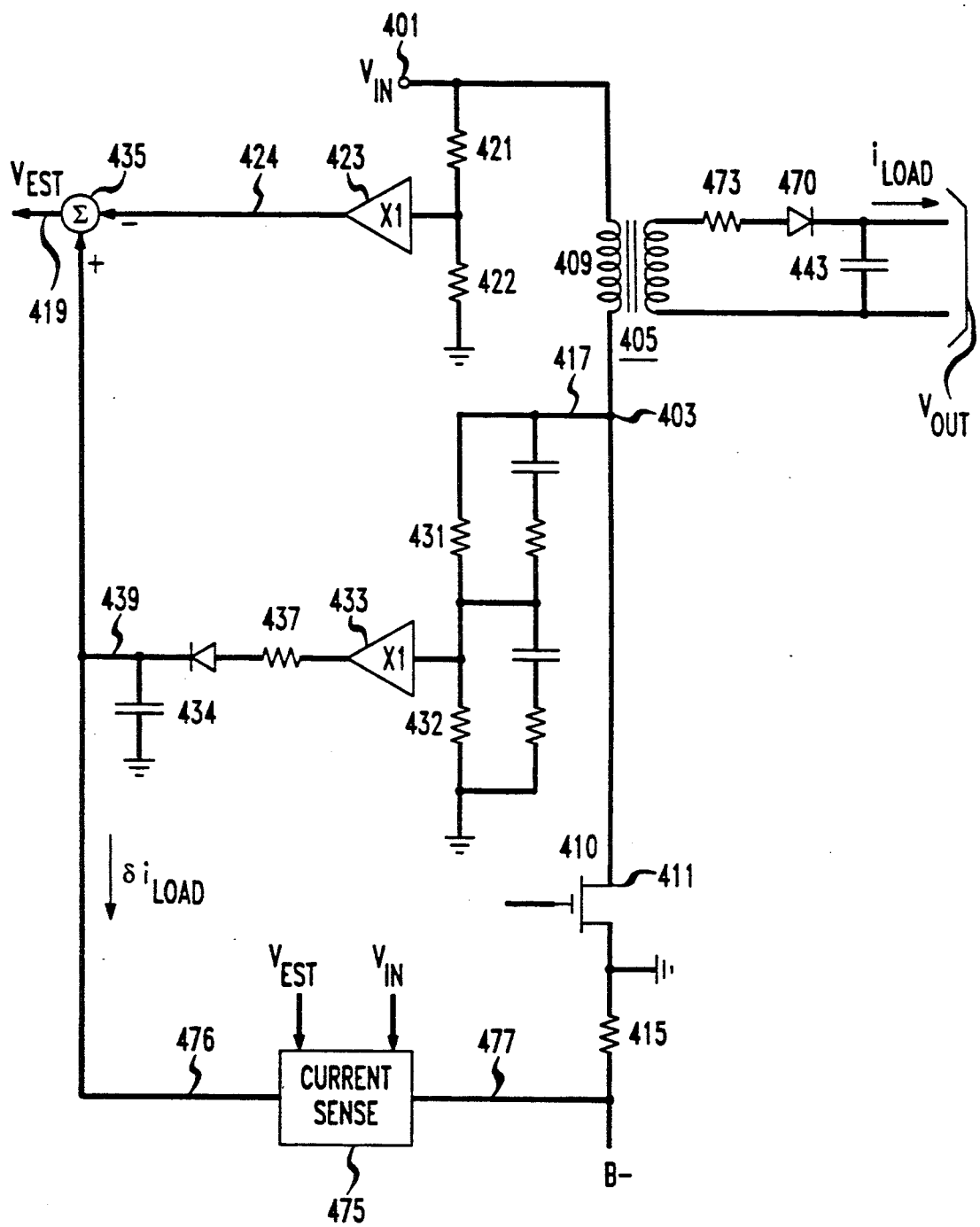
FIG. 4 is a schematic of primary side estimator circuitry of the power converter deriving information from the primary winding of the power transformer.

An embodiment of an improved estimator circuit is shown in the flyback converter shown in FIG. 4. This particular arrangement uses primary side sensing circuitry that relies only on the primary winding for sensing a voltage representative of the secondary winding voltage ($v_{sec}$) and hence, eliminates the need for a tertiary winding on the power transformer. In this illustrative flyback converter, voltage is sensed across the primary winding at node 401($v_{IN}$) and at node 403($v_{PRI}$). Node 403 is common to the primary winding 409 and to the drain 411 of the FET 410. The voltage ($v_{PRI}$) at the drain 411, as sensed by lead 417, may be represented by the expression:

$$v_{PRI} = N \times v_{SEC} + V_{IN}.$$

Two voltage dividers including the resistors 431 and 432 and the resistors 421 and 422, respectively, adjust the sensed primary winding voltage to account for the turns ratio N:1 of the power transformer 405. The voltages sensed at the center nodes of the voltage dividers are coupled through op amps 423 and 433, respectively, to the summing circuit 435 which subtracts the $v_{IN}$ related voltage on lead 424 from the $v_{PRI}$ related voltage on lead 439 and produces an estimate of the output voltage on lead 419. The output of the amplifier 433 is coupled to lead 439 by a diode 434 and a resistor 437 proportionate to the output circuit resistance 473, modified by the load current scaling factor m, which includes the power transformer turns ratio N and to a capacitor 434 also proportional to the output capacitor 443 by the load current scaling factor.

The current through the diode 434 and resistor 437 is an estimate of the secondary current flowing through diode 470 and is derived from the primary current flowing through the FET 410. The source current of FET 410 flows through a resistor 415 and is sensed by a current sense circuit 475. The sensed current on lead 477, as well as the estimated output voltage on lead 419 and the input voltage on lead 401, is applied to the current sense circuit 475 to derive a proportional replica of the output rectifier current on lead 476. The ratio of the estimated voltage and input voltage is processed by current sense circuit 475 to compensate for a difference in conduction duty cycles of FET 410 and the output rectifying diode 470.

Figure 6:
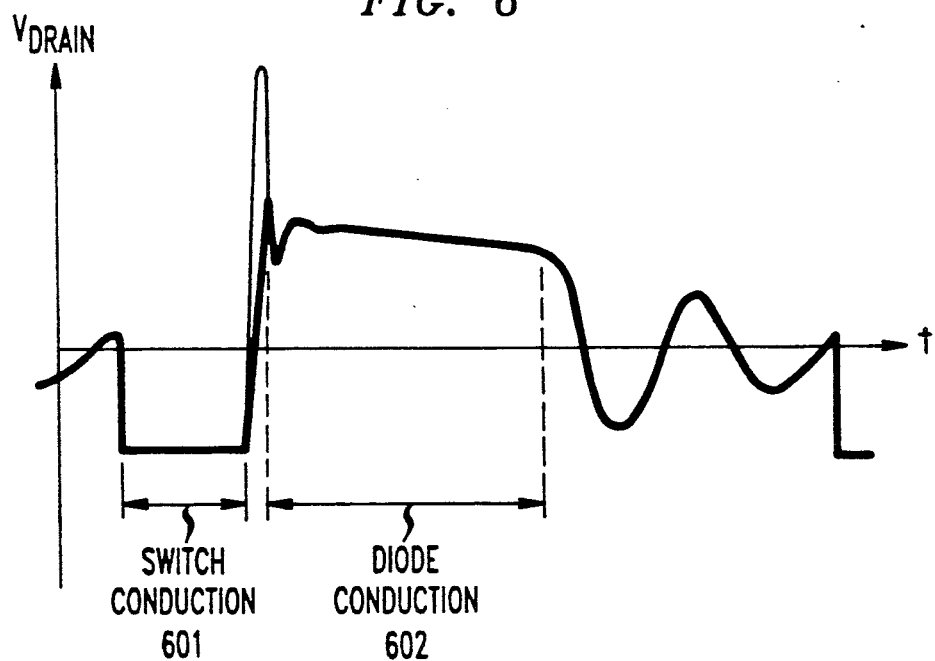
FIG. 6 is a graph of a voltage waveform, of a primary winding of a flyback power converter.

A critical factor in estimating the load current on the primary side of an isolated power converter is the differing conduction duty ratios of the power switch and the rectifying diode. A typical example of the differing conduction duty ratios in a flyback converter may be seen in FIG. 6 which is a graph of a flyback converter primary winding transformer voltage. As shown, the primary winding voltage duration 601, responsive to the power switch conduction interval, can differ considerably from the winding voltage duration 602, responsive to the rectifying diode conduction. It is also apparent that these currents flow at differing times, with the primary current unavailable when the reflected output voltage is available to the implicit primary sensing circuitry.

Figure 5:
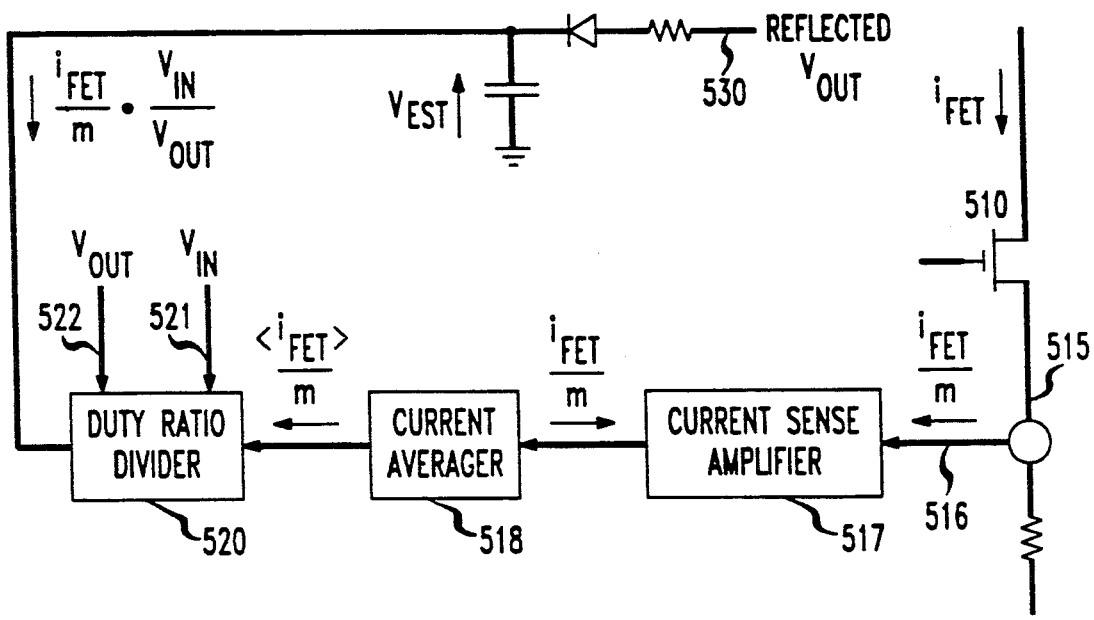
FIG. 5 is a schematic of the primary side current estimating circuitry with duty ratio correction to more accurately estimate an output load current.

A primary side implicit current sensing arrangement that accurately compensates for the differing duty cycle ratios and which may comprise the circuitry of the current sensing circuit of FIG. 4 is shown in FIG. 5. The current is sensed at the source 515 of the FET switch 510 and is coupled by a current lead 516 to a current sensing amplifier 517. The output of the current sensing amplifier 517 is applied to a current averaging circuit 518 which determines an average value for the output of the current sensing amplifier. The current averaging circuit 518 converts the sensed FET current into a DC current before applying it to the subsequent duty ratio divider circuit 520. The duty ratio divider circuit 520 modifies the estimated output current to accommodate the differing conduction duty ratios of the rectifying diode and the FET power switch. These differing duty ratios are derived by comparing the input and output voltages. Where:

$$<i_{RECT}> = <i_{PRI}> \times (V_{IN}/V_{OUT}).$$

Where $<i_{PRI}>$ is the average sensed FET current and $<i_{RECT}>$ is the average rectifier current of the output which is substantially equal to the load current and is used to represent the surrogate load current in the primary estimator circuitry. The input voltage is applied to the duty ratio divider 520 at input lead 521 and a representation of the output voltage, which may comprise the estimated output voltage or if necessitated by circuit operating conditions, a reference voltage equal to or proportionate to the desired output voltage $V_{out}$ is applied to the duty ratio divider 520 at input lead 522.

Figure 7:
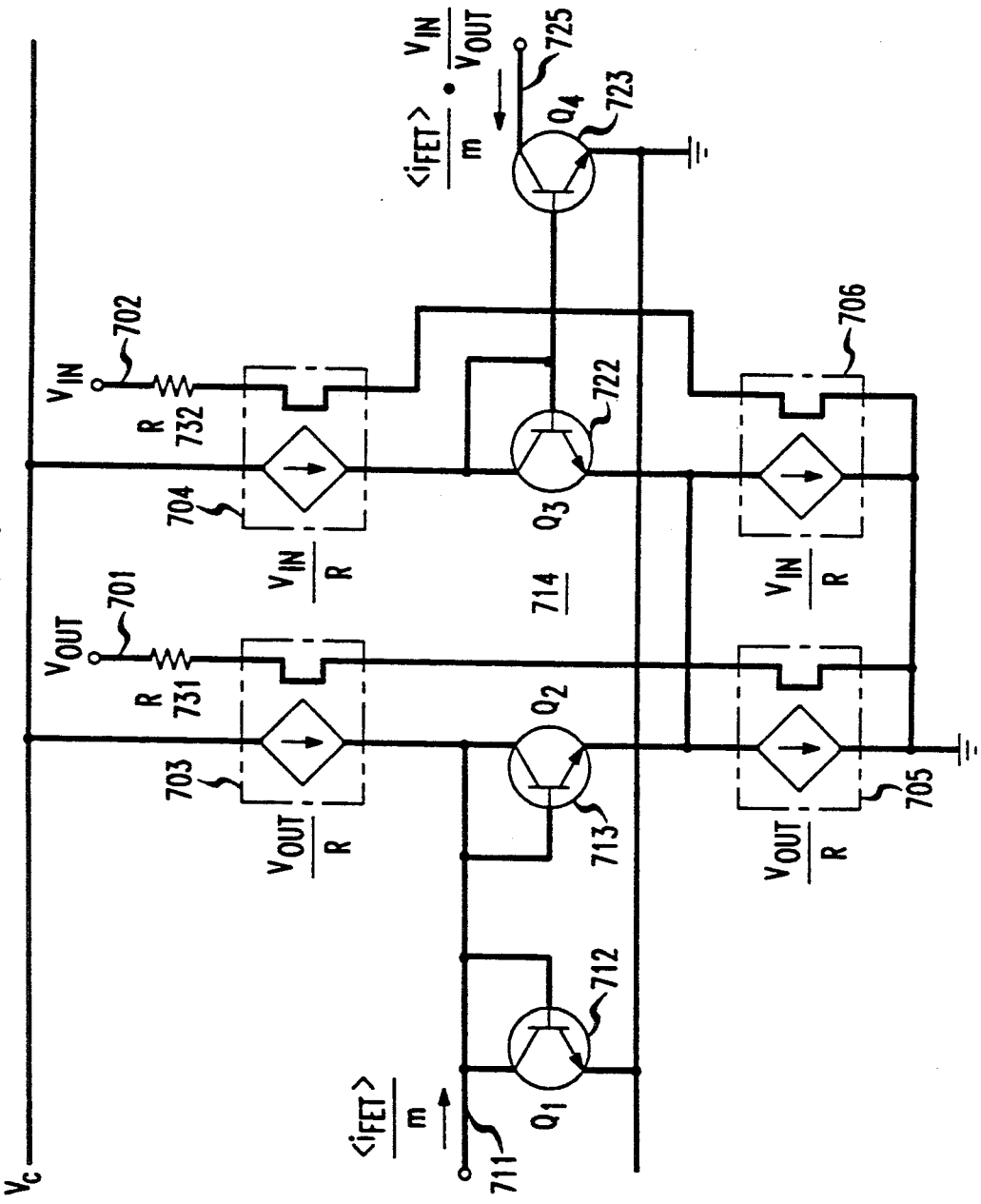
FIG. 7 is a schematic of a current correcting divider using duty ratio correction to more accurately estimate an output load current.

A schematic of a duty ratio divider circuit operative to apply corrections to the rough first estimate of the output load current is shown in FIG. 7. The divider circuit includes two controlled current paths to receive input and estimated output voltages and convert them to proportional currents. These currents together with the primary current value generate the estimated value of the output load current. A first input 701 is connected to receive the estimated output voltage or a nominal reference output voltage and a second input 702 is connected to receive the input voltage. The representative output voltage at lead 701 applied to resistor 731 controls the controlled current sources 703 and 705. The input voltage at lead 702 applied to resistor 732 controls the controlled current sources 704 and 706. The current sensed at the primary winding side of the converter is modified to reflect the load current scaling factor and applied to the diode connected transistor 712, via the lead 711, which is connected to a logarithmic adder circuit 714 comprising diode connected transistors 712, 713, 722 and 723. The two controlled current sources 703 and 705 are connected to source and sink respectively, the logarithmic element diode connected transistor 713. Similarly, the two controlled current sources 704 and 706 are connected to source and sink the logarithmic element diode connected transistor 722. The collector of transistor 723 is connected to an output lead 725 and provides the estimated load current.

In operation the summed voltage across diode connected transistors 712, 713 and 722, which is proportional to the logarithms of the currents through these transistors, controls the voltage across the base-emitter junction of transistor 723 and, hence, controls the estimated output current generated at the output 725. The relevant voltage summing equation is:

$$V_{723} = V_{712} - V_{713} + V_{722}$$

$$\log I_{725} = \log I_{711} - \log(V_{701}/R) + \log(V_{702}/R)$$

and hence, $$I_{725} = I_{711} \times (V_{702}/V_{701}).$$

The detailed circuitry of controlled current sources 705, 704, 705 and 706 is well known in the art. Such circuitry may comprise current mirror circuits responsive to control amplifier circuits. The amplifier circuits are in turn responsive to the input and representative output voltages. It is not believed necessary to disclose this circuitry in detail since suitable circuits for this function may be readily devised by those skilled in the art.

We claim:

1. A power processing circuit, comprising:
    an input for accepting a source of voltage;
    an output for connecting to a load to be energized;
    a power transformer including a primary winding and a secondary winding;
    a power switch for modulating the voltage and applying it to the primary winding;

rectification and filtering means coupling the secondary winding to the output;
circuitry for controlling a duty cycle of the power switch; including:
estimator circuitry located between the input and the primary winding and operative for generating a replica of a signal occurring at least subsequent to the secondary winding of the power transformer and including;
a surrogate impedance representing an impedance intermediate the secondary winding and the load;
circuitry for estimating a current in the secondary winding and applying the current to the surrogate impedance; and
regulation circuitry for driving the power switch in response to a signal produced by the estimator circuitry in order to regulate a signal at the output.

2. A power processing circuit as claimed in claim 1, comprising:
the estimator circuitry includes for adjusting for differences in conducting intervals of the power switch and the rectification means.

3. A power processing circuit as claimed in claim 2, comprising:
the circuit for adjusting including;
first and second controlled current paths;
means to control the first current path in response to a voltage at the input; and
means to control the second current path in response to a represented output voltage, and
means for generating an estimated load current from a power current in the power switching means as adjusted by a ratio of current in the first and second current paths.

4. A power processing circuit as claimed in claim 3, comprising:
the estimator circuitry including circuitry for sensing a voltage of the primary winding and conversion circuitry for adjusting the sensed voltage according to a turns ratio relation of the primary and secondary winding.

5. A power processing circuit as claimed in claim 3, comprising:
the power transformer further including a tertiary winding; and
the estimator circuitry connected to the tertiary winding.

6. A power processing circuit as claimed in claim 3, comprising:
the estimator circuitry being connected to the primary winding of the power transformer.

7. A power processing circuit as claimed in claim 6, comprising:
the conversion circuitry including a first and second voltage divider having a divider impedance ratio substantially equal to the turns ratio and a summing circuit responsive to the first and second voltage divider to sum voltages divided by the first and second voltage dividers.

8. A power converter, comprising:
an output circuit including a rectifier and an output terminal for connecting to a load to be energized;
an input circuit including an input terminal for receiving a source of energy, and a power switch for modulating energy received at the input terminal, regulation circuitry for generating error signals proportional to a deviation of an estimated output signal, generated in the input circuit, from a regulated value, and drive circuitry responsive to the regulation circuitry for controlling conductivity in the power switch;
a power transformer including a primary winding connected to the power switch and a secondary winding connected to the output circuit;
the regulation circuitry including estimator circuitry for generating the estimated output signal in the input circuit by replicating output circuitry signal conditions including;
a first circuit for generating an estimated voltage referenced to a voltage of the output circuit;
a second circuit for sensing a voltage of the input circuit, and
a third circuit for sensing a current of the power switch and generating an estimated output circuit current;
the third circuit including, duty correction circuitry for compensating for different conduction intervals of the rectifier and the power switch and generating an estimated output circuit current in response to the signals of the first, second and third circuits.

9. A power converter as claimed in claim 8, wherein:
the duty correction circuitry includes,
first, second, third and fourth logarithmic devices;
first and second controlled current paths;
means to control a first current in the first current path in response to a voltage signal of the first current path;
means to control a second current in the second current path in response to a voltage signal of the second current path;
an independent current input signal, representing a sample of a current in the power switch, being applied to the first logarithmic device;
the first current of the first current path being a representation of a voltage at the output terminal of the power converter and being coupled to the second logarithmic device;
the second current of the second current path being a representation of a voltage at the power input of the power converter and being coupled to the third logarithmic device;
the voltage of the second logarithmic device connected in series opposition with the voltage of the first logarithmic device;
the voltage of the third logarithmic device connected in series addition with the voltage of the first and second logarithmic devices;
a sum of the voltages of the first, second and third logarithmic devices applied to the fourth logarithmic device and being operative to generate a current signal adjusted by a ratio of the represented input to represented output voltage.

10. In a power converter circuit having its input and output circuits galvanically isolated from one another, a method of estimating an output signal of the power converter circuit on the input side of the converter circuit, comprising the steps of:
sensing in the input circuit a voltage reflected from the output circuit through galvanic isolation separating the input circuit from the output circuit,
sensing in the input circuit a power current interfacing with the galvanic isolation separating the input circuit from the output circuit,
generating an estimated output voltage from the reflected voltage by applying to it, through an estimated output circuit impedance, an estimated dynamic output load generated from the sensed power current,
generating an estimated output current by modifying the power current as a ratio of the estimated voltage and an input circuit voltage.

* * * * *